Patented Feb. 24, 1925.

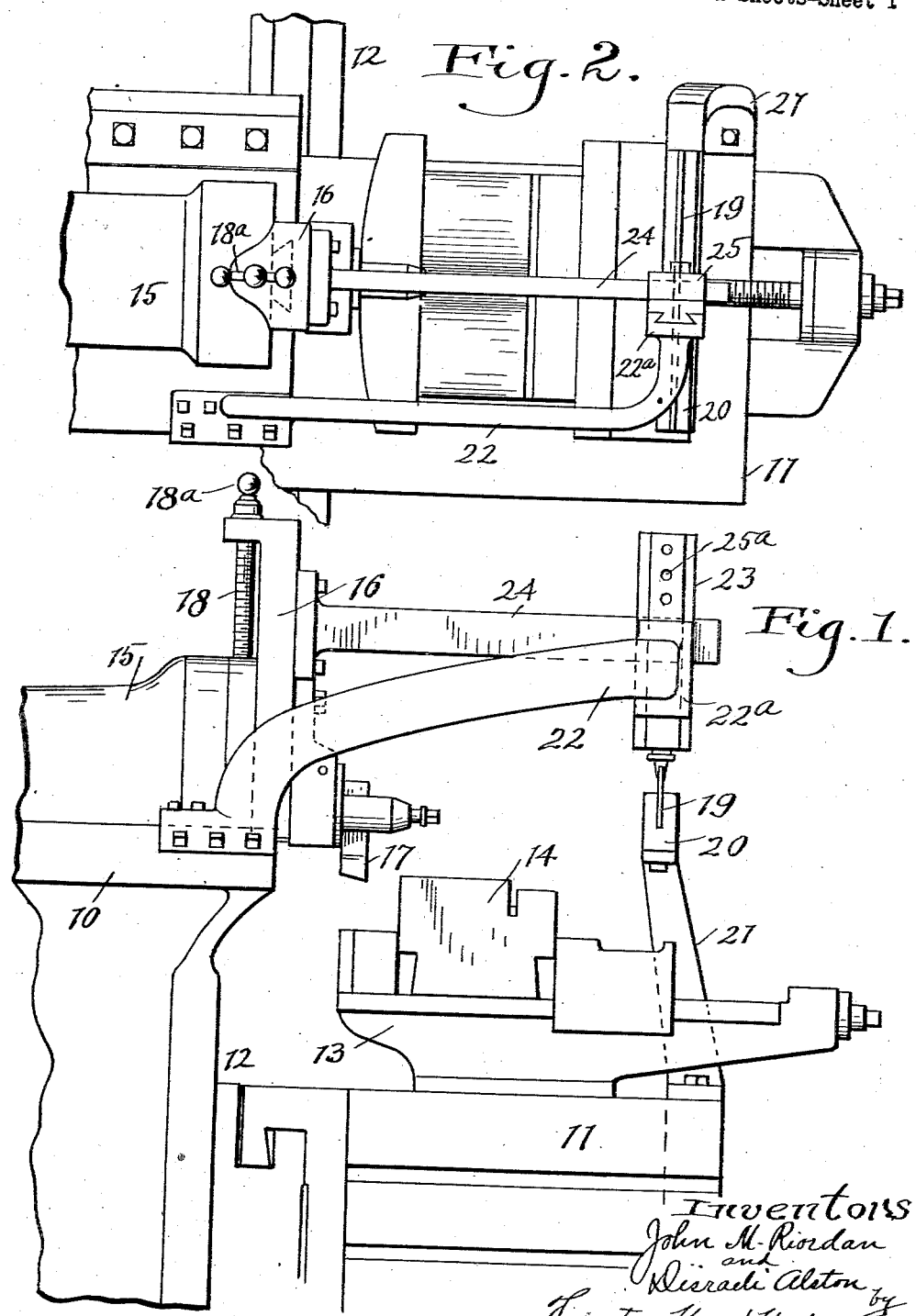

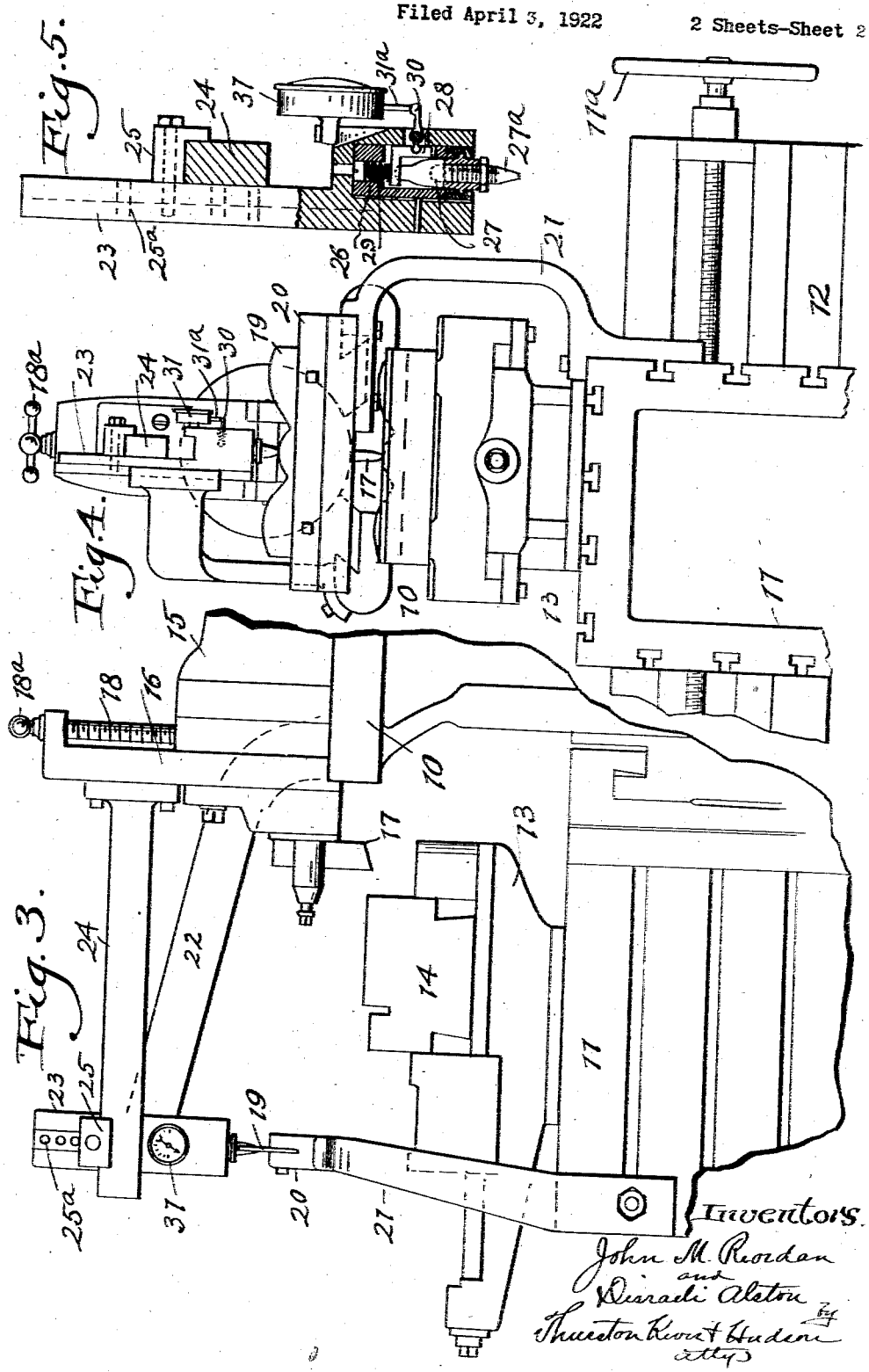

1,527,379

UNITED STATES PATENT OFFICE.

JOHN M. RIORDAN, OF EAST CLEVELAND, AND DISRAELI ALSTON, OF LAKEWOOD, OHIO, ASSIGNORS TO THE CLEVELAND HARDWARE COMPANY, OF CLEVELAND, OHIO, A CORPORATION OF OHIO.

PROFILING ATTACHMENT FOR MACHINE TOOLS.

Application filed April 3, 1922. Serial No. 549,258.

*To all whom it may concern:*

Be it known that we, JOHN M. RIORDAN and DISRAELI ALSTON, citizens of the United States, and residents, respectively, of East Cleveland, in the county of Cuyahoga and State of Ohio, and Lakewood, in the county of Cuyahoga and State of Ohio, have invented a certain new and useful Improvement in Profiling Attachments for Machine Tools, of which the following is a full, clear, and exact description.

This invention relates to a profiling attachment for machine tools, particularly shapers, and covers certain modifications of the profiling attachment constituting the subject matter of a co-pending application filed in the name of John M. Riordan, Serial No. 545,637, filed March 22, 1922, said Riordan being one of the co-inventors of this invention.

In the co-pending application referred to, there is disclosed a profiling attachment for various types of machine tools such as shapers, planers and the like, and in the embodiment illustrated in said application, the attachment is applied to a shaper.

The attachment includes a templet preferably formed from sheet metal whose top edge corresponds to the cross-sectional outline of the piece to be shaped. The templet at all times bears a fixed relation to the work holder and in the embodiment shown in said application it is supported on, and slid laterally along a bar which is supported in fixed position parallel to the path of travel of the work holder as it is fed during the normal operation of the machine, and there is a connection between the work holder and the templet or templet's holding part, so that the templet will move in a lateral direction as the work holder is moved.

Additionally, the attachment includes a tracer which is supported in a tracer carrier, which at all times has a fixed relation to the position of the tool holder in so far as its location with reference to the work is concerned.

The tracer is adapted to travel along the edge of the templet and the carrier for the tracer moves up and down as the tool holder is adjusted through the medium of a bar attached to the tool holder and sliding through an opening in the tracer carrying member and constituting a support for it, this tracer carrying member being supported and guided for vertical movement only as the supporting bar moves vertically when the tool holder is adjusted.

Additionally, the attachment in the embodiment shown, carries an indicator which is adapted to move between a pair of contacts as the tracer is slightly raised and lowered as it follows along the varying contour of the templet and these contacts control magnetic clutch elements to cause a motor to raise or lower as needs be, the tool holder so that the work piece will be shaped on its top surface in accordance with the contour of the templet.

The principal object of the present invention is to provide an attachment embodying the principle of that described above, but modified so as to provide a somewhat simpler and more compact construction, and one which will admit of a closer spacing of the machine tools in the shop.

Further, the invention aims to provide a construction wherein the construction is somewhat simplified with the parts supported to produce accurate work, and wherein the tool holder is raised and lowered by hand, an indicator or gauge being associated with the tracer to indicate the varying position or movement of the tracer with reference to the tracer carrying member and to provide a visual indication as to whether the tool holder should be raised or lowered without making it necessary that the operator keep observing the tool and work piece.

The invention may be briefly summarized as consisting in certain novel details of construction and combinations and arrangements of parts which will be described in the specification and set forth in the appended claims.

In the accompanying sheets of drawings showing the preferred embodiment of the invention, Fig. 1 is a view of the front part of the shaper equipped with the attachment; Fig. 2 is a top plan view of the same; Fig. 3 is a view looking towards the opposite side to that shown in Fig. 1; Fig. 4 is a front view of the same; and Fig. 5 is a detailed sectional view of the tracer carrying member, also of the reciprocating bar which supports it and showing the tracer and indicator or gauge.

Referring now to the drawings, the shaper here shown has a bed 10, at the front of which is a saddle 11 which travels along the saddleways 12, the saddle being adapted to be actuated automatically or by the hand wheel 11a in the customary manner. The saddle has a part which carries the work and may be provided with any suitable work holder here shown in the form of a so-called vise 13, which in Fig. 1 is shown as gripping a work piece 14, such for example, as a block of steel from which a forging die is to be formed.

At the top of the bed 10 is a reciprocating ram 15 provided at the front with a vertically movable tool holder 16 here shown as provided with a cutting tool 17. The tool holder is designed to be raised and lowered by the usual hand operated adjusting screw 18 provided at the top with a handle 18a. The shaper so far described is of the usual form and per se forms no part of the present invention.

In accordance with the present invention, the templet which is shown at 19 is supported at the front of the machine. This templet which is in the form of a comparatively thin plate of metal is secured in a templet carrier 20 supported in horizontal position directly in front of the machine by an arm 21 which extends down to and is secured to the saddle 11.

Extending forwardly and upwardly from the front part of the bed 10 is a fixed or stationary arm 22 which is provided at its front end with a guide 22a on which is guided for vertical movement directly above the templet, a tracer holding block 23, the face of the guide having a dovetail slot and ways which are engaged by a correspondingly shaped face of the block 23.

This tracer carrying block 23 is the part whose position at all times bears a fixed relation to the position of the tool holder in so far as its adjustment toward and from the work is concerned, and in order that it may have this relation, the block is supported by a bar 24 which is secured to and projects forwardly from the tool holder as clearly shown in the drawings. This bar though it supports the block 23, slides relatively to it as the ram and tool holder are reciprocated, and this is brought about by providing on the block 23 a supporting projection 25 which fits over the top of the bar 24 as clearly shown in Figs. 3, 4 and 5. The supporting projection 25 may be positioned at various heights on the block, the latter being provided with a series of openings 25a through which the securing bolt may be passed.

Thus it will be seen that as the ram and tool holder are reciprocated and as the tool holder is raised and lowered, the tracer block 23 will partake only of the vertical movements of the tool holder.

The details of the tracer and of its mounting in the block 23 are precisely like those described in the co-pending application referred to and will be referred to only briefly herein.

Secured in a socket or recess on the under side of the block 23 is a tracer body casing 26, and supported by a flanged collar at the bottom of the tracer body casing is a tracer 27 which is adapted to travel over the top edge of a templet as the templet is moved laterally with the saddle 11. The tracer 27 consists of the tracer proper 27a which is adjustably secured and locked in a small body which carries it, but the two together may be here regarded for convenience as the tracer. As in the co-pending case, the tracer may be elevated slightly, and it may rock relative to the casing 26 if there is side pressure on the point of the tracer. At the upper part of the tracer there is mounted an L-shaped insert 28, and bearing down on top of this insert with predetermined pressure is a coil spring 29 carried in a socket at the top of the tracer casing 26. The under side of the top part of the insert 28 is beveled, and this is engaged by the top of the tracer. This L-shaped insert 28 likewise extends downward beneath the top of the tracer, and in this part there is a notch which receives the inner relatively short end of a pivoted rocking finger 30 extending through an opening in the tracer block 23 as shown in Fig. 5.

In accordance with the present invention there is employed in connection with this finger, an indicator in the form of a gauge 31. This gauge which may be of standard construction, has a dial, and an indicating pointer or needle which sweeps around it, and the movement of the finger resulting from the movement of the tracer is transmitted to the pointer through the medium of a vertically movable stem 31a which extends down from the bottom of the indicator and engages the outer end of the finger 30.

It will be apparent from the above description that when the machine is in operation the work and work holder will travel along with the saddle across the front of the machine, and the templet has this same movement. Likewise it will be apparent that the tracer has a movement only in the plane of the templet, this movement being a slight vertical movement or a slight rocking movement of the tracer in the casing which immediately receives it, or the movement due to vertical movement of the block 23, and as the ram is reciprocated the tracer supporting block 23 will remain stationary notwithstanding the fact that it is supported on the reciprocating bar 24, but will respond to and have precisely the same movements which are imparted to the work holder by turning the adjusting screw 18.

Therefore, in operation the point of the tracer rests upon the top edge of the templet and the tracer is so set that when the tool holder is at the right height the tracer should occupy substantially a mid position between the extremes of its limited movement in the tracer casing 26, and the needle of the indicator should stand at what may be termed the zero position. When occupying this position, as when a horizontal portion of the templet is traveling underneath the point of the tracer, the operator need give no adjustment to the tool holder, but when the contour of the templet changes by rising or falling, the position of the tracer will change, either rise or fall, and this very slight movement is shown on the indicator by a shift in the position of the needle, the gauge or indicator greatly magnifying the movement. The operator who will generally keep his hand on the feed handle 18$^a$ for the work holder will then turn the same to raise or lower the work holder as is required by the position of the indicator. Thus it is only necessary for him to watch the indicator and to turn the feed handle for the work holder so as to raise or lower it as the case may be, and it will be unnecessary for him to attempt to adjust or determine what adjustment should be given to the tool holder by watching the tool and work. In this manner the operator can machine the piece very accurately by observing the indicator and adjusting the work holder as required.

Having described our invention, we claim:

1. In combination with a metal working machine having relatively movable work and tool holders wherein one has a definite path of travel relative to the other and wherein there are two feeds, a profiling attachment comprising a tracer and a templet, the tracer adapted to travel along the edge of the templet, a member carrying the tracer, the templet and tracer carrying member having movements corresponding to the two feeds, and a direct reading indicator operatively connected to the tracer.

2. In combination with a metal working machine having relatively movable work and tool holders wherein one has a definite path of travel relative to the other, and wherein there are two feeds, a profiling attachment comprising a tracer and a templet, the tracer adapted to travel along the edge of the templet, a member carrying the tracer, the templet and tracer carrying member having relative movements corresponding to the two feeds, the tracer being capable of a slight movement in the tracer carrying member so as to respond to the varying contour of the templet, an actuating lever connected to the tracer and an indicator operatively connected to the lever.

3. In combination with a machine tool having a work holder, a reciprocating tool holder adapted to be fed up and down and the work holder to be fed laterally, a templet supported at the front of the work holder and having a movement corresponding to the feed thereof, the tracer having a tracer carrying member guided for vertical movement, and the tool holder having a reciprocating bar projecting forwardly and slidingly engaging the tracer carrying member.

4. In combination with a machine tool having a work holder adapted to be given a lateral feed, a reciprocating ram having a tool holder, the tool holder being adapted to be given a vertical feed, a templet supported at the front of the work holder and having a movement corresponding to the feed thereof, a reciprocating bar rigidly attached to and projecting forwardly from the work holder, a tracer, a tracer carrying member having a part resting upon said bar and with reference to which said bar slides, and a stationary guide for permitting the tracer carrying member to have a vertical movement corresponding to the vertical movement of said bar and of the tool holder.

5. A machine tool having a bed, a work holder adapted to be given a lateral feed, a reciprocating ram carrying a tool holder adapted to be given a feed at right angles to the feed of the work holder, a templet supported so as to have a movement corresponding to the feed of the work holder, a stationary guide supported on the bed and having a guide surface parallel to the feed of the tool holder, a tracer carrying member guided by said guide, a reciprocating bar attached to the tool holder and projecting forwardly therefrom so as to reciprocate with and have a feed corresponding to the feed of the tool holder, said bar supporting and having sliding engagement with the tracer carrying member, and a tracer supported at the bottom of said tracer carrying member and normally resting on the edge of said templet.

6. In combination with a machine tool having a work holder and a tool holder, one reciprocating relative to the other and both having feeds one in a direction at right angles to the other, a profiling attachment comprising a tracer and a templet, the tracer adapted to travel along the edge of the templet, a member carrying the tracer, the templet and tracer carrying member being supported one by the work holder and the other by the tool holder and each having a movement corresponding to the feed of the member supporting it, the tracer being capable of a slight movement in the tracer carrying member so as to respond to the varying contour of the templet, and a direct reading indicator operatively connected to the tracer.

7. In combination with a shaper having a work holder and a reciprocating ram having a tool holder, the tool holder adapted to be fed up and down and the work holder laterally, a templet supported by the work holder and having a movement corresponding to the feed thereof, the tracer having a tracer carrying member supported by the tool holder, means for supporting the tracer carrying member so that it will partake only of the feed of the tool holder, the tracer being capable of a slight movement in the tracer carrying member so as to respond to the varying contour of the templet, and an indicator operatively connected to the tracer.

8. In combination with a machine tool having a work holder, a reciprocating tool holder adapted to be fed up and down and the work holder to be fed laterally, a templet supported at the front of the work holder and having a movement corresponding to the feed thereof, the tracer having a tracer carrying member guided for vertical movement, and the tool holder having a reciprocating bar projecting forwardly and slidingly engaging the tracer carrying member, the tracer being capable of a slight movement in the tracer carrying member so as to respond to the varying contour of the templet, and an indicator operatively connected to the tracer.

9. In combination with a machine tool having a work holder adapted to be given a lateral feed, a reciprocating ram having a tool holder, the tool holder being adapted to be given a vertical feed, a templet supported at the front of the work holder and having a movement corresponding to the feed thereof, a reciprocating bar rigidly attached to and projecting forwardly from the work holder, a tracer, a tracer carrying member having a part resting upon said bar and with reference to which said bar slides, and a stationary guide for permitting the tracer carrying member to have a vertical movement corresponding to the vertical movement of said bar and of the tool holder, the tracer being capable of a slight movement in the tracer carrying member so as to respond to the varying contour of the templet, and an indicator operatively connected to the tracer.

10. A machine tool having a bed, a work holder adapted to be given a lateral feed, a reciprocating ram carrying a tool holder adapted to be given a feed at right angles to the feed of the work holder, a templet supported so as to have a movement corresponding to the feed of the work holder, a stationary guide supported on the bed and having a guide surface parallel to the feed of the tool holder, a tracer carrying member guided by said guide, a reciprocating bar attached to the tool holder so as to reciprocate with and have a feed corresponding to the feed of the tool holder, said bar supporting and having sliding engagement with the tracer carrying member, a tracer supported at the bottom of said tracer carrying member and normally resting on the edge of said templet, the tracer being capable of a slight movement in the tracer carrying member so as to respond to the varying contour of the templet, and a direct reading indicator operatively connected to the tracer.

In testimony whereof, we hereunto affix our signatures.

JOHN M. RIORDAN.
DISRAELI ALSTON.